April 9, 1940.   J. THOMSON   2,196,368
EPICYCLIC GEARING
Filed Sept. 1, 1939
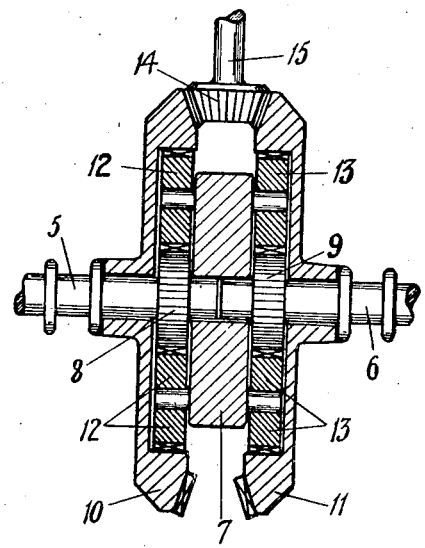
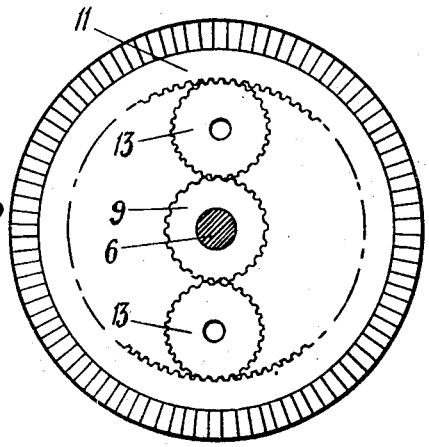
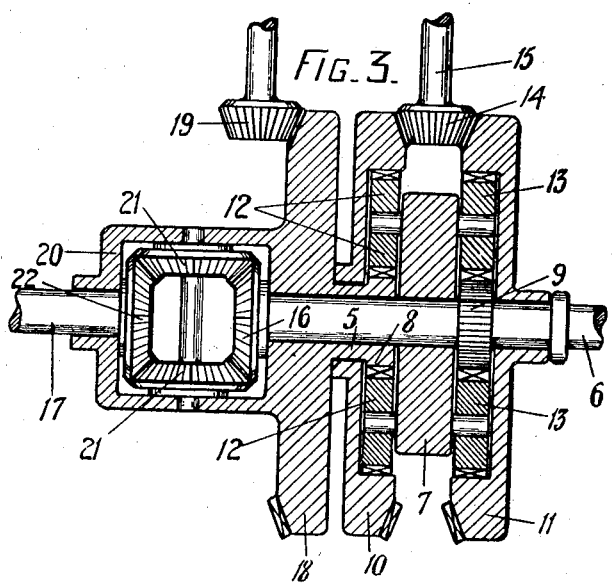
Inventor
James Thomson.
By Williams, Bradbury,
McCaleb & Hinkle, Attys.

Patented Apr. 9, 1940

2,196,368

UNITED STATES PATENT OFFICE 2,196,368

EPICYCLIC GEARING

James Thomson, Aberdeen, Scotland

Application September 1, 1939, Serial No. 293,003
In Great Britain September 1, 1938

5 Claims. (Cl. 74—282)

This invention has reference to an improvement in variable-speed epicyclic gearing, the object of the invention being the provision of mechanism which may be used to control the rotation of either of two rotatable shafts interconnected through the improved gearing and which, when used in combination with a differential or balance gear, may be used to control the relative speeds of two shafts between which the differential or balance gear is interposed.

As will be hereinafter explained, the invention provides a means of steering endless track vehicles. The invention also provides a means of minimising wheel spin in the driving wheels of motor road vehicles wherein the driving wheel axles are driven through a differential or balance gear.

According to the invention a variable-speed epicyclic gear comprises twin epicyclic gear trains interposed between two shafts and comprising a pair of sun wheels one fixed on each shaft, two sets of planet wheels mounted on a carrier common to the two epicyclic gear trains, and an outer internally toothed ring rotatable upon each shaft, one set of planet wheels meshing with the sun wheel and outer ring on one shaft and the other set of planet wheels meshing with the sun wheel and outer ring on the other shaft, and the two outer rings are controlled by manually or mechanically operable means for preventing rotation of the outer rings and for effecting or permitting corresponding rotation in opposite directions of the two outer rings. Preferably the outer rings have external teeth which may conveniently mesh with a pinion or pinions rotatable on a fixed axis or on fixed axes, and rotation of the pinion or pinions in either direction can be permitted or effected by hand-operated or mechanically-operated means.

According to a modification, one outer ring is permanently fixed and the other outer ring is rotatable and controlled by manually or mechanically operable means for effecting or permitting its rotation in either direction, for example, the rotatable outer ring is externally toothed and meshes with a pinion the rotation of which in either direction can be permitted or effected by hand-operated or mechanically-operated means.

A variable-speed epicyclic gear according to either of the two immediately preceding paragraphs may be used in combination with a differential or balance gear for controlling the relative speeds of two shafts between which the differential or balance gear is interposed. In such case the variable-speed epicyclic gear according to either of the two immediately preceding paragraphs is interposed between one of the shafts and the differential or balance gear, one of the sun wheels of the twin epicyclic gear trains being arranged to turn with the planet wheel carrier of the differential or balance gear and the other sun wheel being fixed to the shaft which is disposed on the opposite side of the epicyclic gear to that of the planet wheel carrier of the differential or balance gear.

In order that the invention may be more clearly understood, reference is hereinafter made to the accompanying drawing wherein Fig. 1 is a sectional side view of the improved epicyclic gear and Fig. 2 is a front view of one half of the gearing. Fig. 3 is a sectional side view of the epicyclic gear combined with a differential or balance gear.

Referring firstly to Figs. 1 and 2, the drawing shows two coaxial rotatable shafts 5 and 6, their abutting ends turning freely in a carrier member 7. Either shaft may be a driving shaft. Shaft 5 has a sun wheel 8 fixed thereon and shaft 6 has a sun wheel 9 fixed thereon, the two sun wheels being of the same diameter. Upon shaft 5 there is freely mounted a ring 10 having internal teeth. A similar ring 11 is freely mounted on shaft 6. Rotatable upon pins carried by the carrier member 7 are two sets of planet wheels 12 and 13, all of equal size. The planet wheels 12 mesh with the sun wheel 8 and with the internal teeth of the ring 10. The planet wheels 13 mesh with the sun wheel 9 and with the internal teeth of the ring 11. It will be apparent that, if the rings 10 and 11 are prevented from rotation, either of the shafts 5 and 6 will drive the other at the same speed through the double train of epicyclic gearing.

According to the invention, one of the rings 10 and 11 is fixed and rotation of the other is controlled, or both rings may be rotated, or permitted to rotate, in opposite directions. In the form of the invention shown in Figs. 1 and 2, the rings 10 and 11 have crown teeth which mesh with a common pinion 14 fixed on a control spindle 15. If the spindle 15 is prevented from rotation the rings 10 and 11 will remain stationary, and if the spindle 15 is rotated in either direction the rings 10 and 11 will be rotated in opposite directions, thus varying the relative speeds of the shafts 5 and 6. Thus, if the shafts 5 and 6 drive the endless-track members of an endless-track vehicle, and if either shaft is driven from the engine either directly or through a differential gear, turning of the spindle 15 in either direction can be employed to vary the relative speeds of the shafts 5 and 6 and thus enable the vehicle to be steered in either direction. The spindle 15 can be controlled by a hand control or by any convenient mechanical means.

Referring now to Fig. 3, which shows my improved epicyclic gear combined with a differential or balance gear, like parts are given the same reference characters. In this case the shaft 5 forms the hollow hub of the sun wheel 8 for the passage through it of the shaft 6 which carries one bevel pinion 16 of a differential bevel gear interposed between the shaft 6 and a coaxial shaft 17 and supports a crown wheel 18 driven by a driving pinion 19. The crown wheel 18 is fixed to a rotatable casing or planet wheel carrier 20 which, in known manner, carries the planet wheels 21 meshing with the bevel pinion 16 and with a bevel pinion 22 fixed on shaft 17. The crown wheel 18 is fixed to the hollow hub 5 of the sun wheel 8. The outer ring 10 is free to rotate on the said hub and the outer ring 11 is free to rotate on shaft 6, their rotation being controlled by the pinion 14 on the control spindle 15. If the shafts 6 and 17 constitute the driving axles of a road vehicle and the pinion 19 is driven from the engine, the gear will function as an ordinary balance gear so long as the control pinion 14 is free to rotate, because the outer rings 10 and 11 and the planet wheels 12 and 13 will be free to revolve around the sun wheels 8 and 9. If either shaft 6 or 17 overruns the other, the sun pinions 8 and 9 will cause relative rotation of the outer rings 10 and 11 so long as the control pinion 14 is free to permit such relative rotation. If, however, the rotation of the control pinion 14 is controlled by retarding rotation of the control spindle 15, relative rotation of the outer rings 10 and 11 can be controlled, with the result that the balancing action of the differential gear 16, 18, 19, 20, 21 and 22 will be opposed and the relative speeds of the shafts 6 and 17 will be controlled. By completely preventing rotation of the control spindle 15 and its pinion 14, the outer rings 10 and 11 will be locked against rotation, thus putting the differential gear out of action, when the power transmitted by the driving pinion 19 to the axles 6 and 17 will be transmitted equally to both axles which will revolve at the same speed as each other. In this manner wheel slip of either of the wheels on the axles 6 and 17 can be controlled.

I claim:

1. Variable-speed mechanism comprising, in combination, a differential gear interposed between two shafts and including main sun wheels on each shaft, main planet wheels meshing with said main sun wheels, a rotatable carrier for said planet wheels, and means for rotating said carrier, twin epicyclic gear trains interposed between one of said shafts and the carrier, said gear trains including two secondary sun wheels, one on the last-mentioned shaft, and one turning with the carrier, two sets of secondary planet wheels each set meshing with one of the secondary sun wheels, a secondary carrier for the two secondary sets of planet wheels, a pair of rotatable internally toothed elements meshing one with each set of secondary planet wheels, and controlling means for preventing rotation of both of said elements and for controlling rotation of said elements in opposite directions to one another.

2. Variable-speed mechanism comprising, in combination, a differential gear interposed between two shafts and including main sun wheels on each shaft, main planet wheels meshing with said main sun wheels, a rotatable carrier for said planet wheels, and means for rotating said carrier, twin epicyclic gear trains interposed between one of said shafts and the carrier, said gear trains including two secondary sun wheels, one on the last-mentioned shaft and one turning with the carrier, two sets of secondary planet wheels each set meshing with one of the secondary sun wheels, a secondary carrier for the two secondary sets of planet wheels, a pair of rotatable internally toothed elements meshing one with each set of secondary planet wheels, controlling means for preventing rotation of one of said elements and means for controlling rotation of the other of said elements in either direction and for preventing its rotation.

3. Variable-speed mechanism comprising, in combination, a differential gear interposed between two shafts and including main sun wheels on each shaft, main planet wheels meshing with said main sun wheels, a rotatable carrier for said planet wheels, and means for rotating said carrier, twin epicyclic gear trains interposed between one of said shafts and the carrier, said gear trains including two secondary sun wheels, one on the last-mentioned shaft and one turning with the carrier, two sets of secondary planet wheels each set meshing with one of the secondary sun wheels, a secondary carrier for the two secondary sets of planet wheels, a pair of rotatable internally toothed elements meshing one with each set of secondary planet wheels, controlling means for preventing rotation of one of said elements, a ring of external teeth on the other of said elements and a control pinion meshing with said ring.

4. Variable-speed mechanism comprising, in combination, a differential gear interposed between two shafts and including main sun wheels on each shaft, main planet wheels meshing with said main sun wheels, a rotatable carrier for said planet wheels, and means for rotating said carrier, twin epicyclic gear trains interposed between one of said shafts and the carrier, said gear trains including two secondary sun wheels, one on the last-mentioned shaft and one turning with the carrier, two sets of secondary planet wheels each set meshing with one of the secondary sun wheels, a secondary carrier for the two secondary sets of planet wheels, a pair of rotatable internally toothed elements meshing one with each set of secondary planet wheels, a ring of external teeth on each of said elements and a control pinion meshing with each of said rings.

5. Variable-speed mechanism comprising, in combination, a differential gear interposed between two shafts and including main sun wheels on each shaft, main planet wheels meshing with said main sun wheels, a rotatable carrier for said planet wheels, and means for rotating said carrier, twin epicyclic gear trains interposed between one of said shafts and the carrier, said gear trains including two secondary sun wheels, one on the last-mentioned shaft and one turning with the carrier, two sets of secondary planet wheels each set meshing with one of the secondary sun wheels, a secondary carrier for the two secondary sets of planet wheels, a pair of rotatable internally toothed elements meshing one with each set of secondary planet wheels, a ring of external teeth on each of said elements and a common control pinion meshing with both of said rings.

JAMES THOMSON.